United States Patent
Chen et al.

(10) Patent No.: US 10,336,955 B2
(45) Date of Patent: *Jul. 2, 2019

(54) FIXED BED GASIFIER AND METHOD OF GASIFICATION OF BIOMASS USING THE SAME

(71) Applicant: WUHAN KAIDI GENERAL RESEARCH INSTITUTE OF ENGINEERING & TECHNOLOGY CO., LTD., Wuhan (CN)

(72) Inventors: Yilong Chen, Wuhan (CN); Yanfeng Zhang, Wuhan (CN); Minggui Xia, Wuhan (CN); Liang Zhang, Wuhan (CN)

(73) Assignee: WUHAN KAIDI GENERAL RESEARCH INSTITUTE OF ENGINEERING & TECHNOLOGY CO., LTD., Wuhan (CN)

( * ) Notice: Subject to any disclaimer, the term of this patent is extended or adjusted under 35 U.S.C. 154(b) by 134 days.

This patent is subject to a terminal disclaimer.

(21) Appl. No.: 14/315,313

(22) Filed: Jun. 25, 2014

(65) Prior Publication Data
US 2014/0306161 A1 Oct. 16, 2014

Related U.S. Application Data

(63) Continuation-in-part of application No. PCT/CN2012/083569, filed on Oct. 26, 2012.

(30) Foreign Application Priority Data

Dec. 29, 2011 (CN) .......................... 2011 1 0449459

(51) Int. Cl.
C10J 3/72 (2006.01)
C10J 3/18 (2006.01)
C10J 3/06 (2006.01)

(52) U.S. Cl.
CPC . *C10J 3/72* (2013.01); *C10J 3/06* (2013.01); *C10J 3/18* (2013.01); *C10J 3/723* (2013.01); C10J 2300/0916 (2013.01); C10J 2300/0959 (2013.01); C10J 2300/0976 (2013.01); C10J 2300/1238 (2013.01);
(Continued)

(58) Field of Classification Search
CPC combination set(s) only.
See application file for complete search history.

(56) References Cited

U.S. PATENT DOCUMENTS 3,948,640 A * 4/1976 Elvander ................ B01J 8/1836
75/10.17
7,090,707 B1 * 8/2006 Barot ....................... C10J 3/485
48/113

(Continued)

*Primary Examiner* — Imran Akram
(74) *Attorney, Agent, or Firm* — Matthias Scholl P.C.; Matthias Scholl

(57) ABSTRACT

A gasifier, including a vertically disposed furnace body, a monitoring unit, and a microwave plasma generating device. The furnace body includes a material and fuel inlet, a syngas outlet, an oxygen/vapor inlet, and a slag outlet. The furnace body has a clearance zone in an upper part thereof and a fixed bed zone in a lower part thereof. The slag outlet is disposed at the bottom of the furnace body. The monitoring unit is disposed close to the syngas outlet. At least one microwave plasma generating device is disposed on the furnace body.

6 Claims, 2 Drawing Sheets

(52) U.S. Cl.
CPC ..... *C10J 2300/1246* (2013.01); *Y02P 20/129* (2015.11); *Y02P 20/145* (2015.11)

(56) References Cited

U.S. PATENT DOCUMENTS

| | | | |
|---|---|---|---|
| 2004/0251241 A1* | 12/2004 | Blutke | C01B 3/342 219/121.59 |
| 2007/0253874 A1* | 11/2007 | Foret | C02F 1/006 422/186.07 |
| 2007/0266633 A1* | 11/2007 | Tsangaris | C01B 3/342 48/197 R |
| 2008/0277265 A1* | 11/2008 | Tsangaris | C10J 3/24 204/157.15 |
| 2009/0200180 A1* | 8/2009 | Capote | C02F 1/4608 205/744 |
| 2010/0219062 A1* | 9/2010 | Leon Sanchez | C10J 3/466 204/157.43 |
| 2011/0036014 A1* | 2/2011 | Tsangaris | C01B 3/22 48/62 R |

\* cited by examiner

FIXED BED GASIFIER AND METHOD OF GASIFICATION OF BIOMASS USING THE SAME

CROSS-REFERENCE TO RELATED APPLICATIONS

This application is a continuation-in-part of International Patent Application No. PCT/CN2012/083569 with an international filing date of Oct. 26, 2012, designating the United States, now pending, and further claims priority benefits to Chinese Patent Application No. 201110449459.6 filed Dec. 29, 2011. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18$^{th}$ Floor, Cambridge, Mass. 02142.

BACKGROUND OF THE INVENTION

Field of the Invention

The invention relates to the gasification of biomass and solid wastes, and more particularly to a gasifier and a method for gasifying biomass and solid wastes to synthesize high quality syngas in the presence of microwave plasma.

Description of the Related Art

Currently, the fixed bed gasification has defects such as low gasification temperature, high tar content, and low-quality syngas. Low gasification temperature results in high content of tar in the syngas. The tar is difficult to remove and easily blocks and corrodes the valves, pipes, and auxiliary equipment. The removal of the tar costs much. With the development of microwave technology, microwave plasma, with its own excellent characteristics, has widely applied to low temperature chemical vapor deposition gradually (CVD), rapid preparation of optical fibers, submicron etching of chips, surface modification of polymer materials, microelectronic materials processing, and so on.

SUMMARY OF THE INVENTION

In view of the above-described problems, it is one objective of the invention to provide a fixed bed gasifier and a method using the same for the gasification of biomass to synthesize high quality syngas, particularly to synthesize the syngas comprising CO and $H_2$ with characteristics of economy and high efficiency.

To achieve the above objective, in accordance with one embodiment of the invention, there is provided a fixed bed gasifier, comprising a vertically disposed furnace body, a monitoring unit, and a microwave plasma generating device, the furnace body comprising a material and fuel inlet, a syngas outlet, an oxygen/vapor inlet, and a slag outlet. The furnace body comprises a clearance zone in an upper part thereof and a fixed bed zone in a lower part thereof. The slag outlet is disposed at a bottom of the furnace body. The monitoring unit is disposed close to the syngas outlet. At least one microwave plasma generating device is disposed on the furnace body.

In a class of this embodiment, a first microwave plasma generating device is disposed between the fixed bed zone in the lower part of the furnace body and the material and fuel inlet, and a second microwave plasma generating device is disposed in the clearance zone in the upper part of the furnace body; the first microwave plasma generating device comprises two or three layers of microwave plasma generators, the second microwave plasma generating device comprises one or two layers of microwave plasma generators, and each layer of the microwave plasma generators comprises three or four evenly distributed working gas inlets.

In a class of this embodiment, the first microwave plasma generator has large power and small electrode gap, and produces high temperature of plasma; the second microwave plasma generator has large electrode gap, strong plasma activity, and wide volume range.

In a class of this embodiment, a microwave power source of the microwave plasma generators has a basic frequency of 2.45 GHz, and a power of a single microwave plasma generator is within 200 kW.

In a class of this embodiment, an upper oxygen/vapor nozzle is disposed in the clearance zone of the furnace body, and a lower oxygen/vapor nozzle is disposed in the fixed bed zone of the furnace body.

A method of gasification using the gasifier comprises:

1) feeding biomass fuel and waste into the furnace body via a feeder, allowing the biomass fuel and waste to be combusted and gasified in the fixed bed zone to yield high temperature flue gas, allowing the flue gas to flow upward to exchange heat with newly-fed biomass fuel and waste in a feeding zone of the gasifier, and meanwhile allowing the flue gas to react with vapor sprayed from the lower oxygen/vapor nozzle and with a plasma oxidizer generated by the first microwave plasma generator to yield syngas, of which a chemical equation being: $2C+O_2=2CO$, $C+H_2O=CO+H_2$, a gasification temperature being between 700 and 1600° C.;

Within the temperature range, the microwave-excited plasma oxidizer has high degree of ionization, high degree of dispersion, and strong oxidation activity and chemical reactivity. Thus, even in a relatively low ambient temperature, the chemical reaction can proceed. The conversion efficiency of the biomass fuel is high, and the syngas comprising CO and $H_2$ has high quality and little tars;

2) allowing the syngas to flow upward to the clearance zone, where tars in the syngas are cracked and hydrocarbons in the syngas are converted in the presence of plasma generated by the second microwave plasma generator;

3) allowing coke residues to fall downward to the fixed bed zone and release thermal energy to maintain the temperature of the fixed bed zone, and discharging slags from the slag outlet; and 4) monitoring in real time a temperature and components of the syngas by the monitoring unit disposed close to the syngas outlet to maintain process parameters within a preset range.

In a class of this embodiment, in step 1), the gasification temperature is between 700 and 1600° C.; and in step 4), the temperature of the syngas is within 1200° C.

In a class of this embodiment, in step 1), the gasification temperature is between 750 and 950° C.

In a class of this embodiment, in step 1), the vapor sprayed from the lower oxygen/vapor nozzle operates to increase the vapor concentration thereby prompting the reaction between the carbon residues and the vapor; in step 2), a total power of the second microwave plasma generator meets the requirement for supplying thermal energy for the reaction equilibrium; in step 2), the appropriate high temperature vapor is sprayed from the upper oxygen/vapor nozzle to prompt the cracking reaction of the tars.

Advantages according to embodiments of the invention are summarized as follows.

1. In the presence of high degree of ionization and high degree of dispersion of microwave plasma, the biomass fuel in the gasifier is converted with high efficiency, and the cold gas efficiency is significantly improved compared to that in conventional gasification processes, exceeding 85%.

2. The microwave plasma generator disposed in the clearance zone of the gasifier facilitates the unbalance cracking of tars in the syngas, and thus the syngas contains little or no tars, which can be directly used in industry, with simple process and good economic efficiency.

3. The gasifier has no specific requirement on the particle size of biomass fuel, primary crushing can meet the requirement of particle size, and thus the production costs are low, with good economic efficiency.

Figure 1:
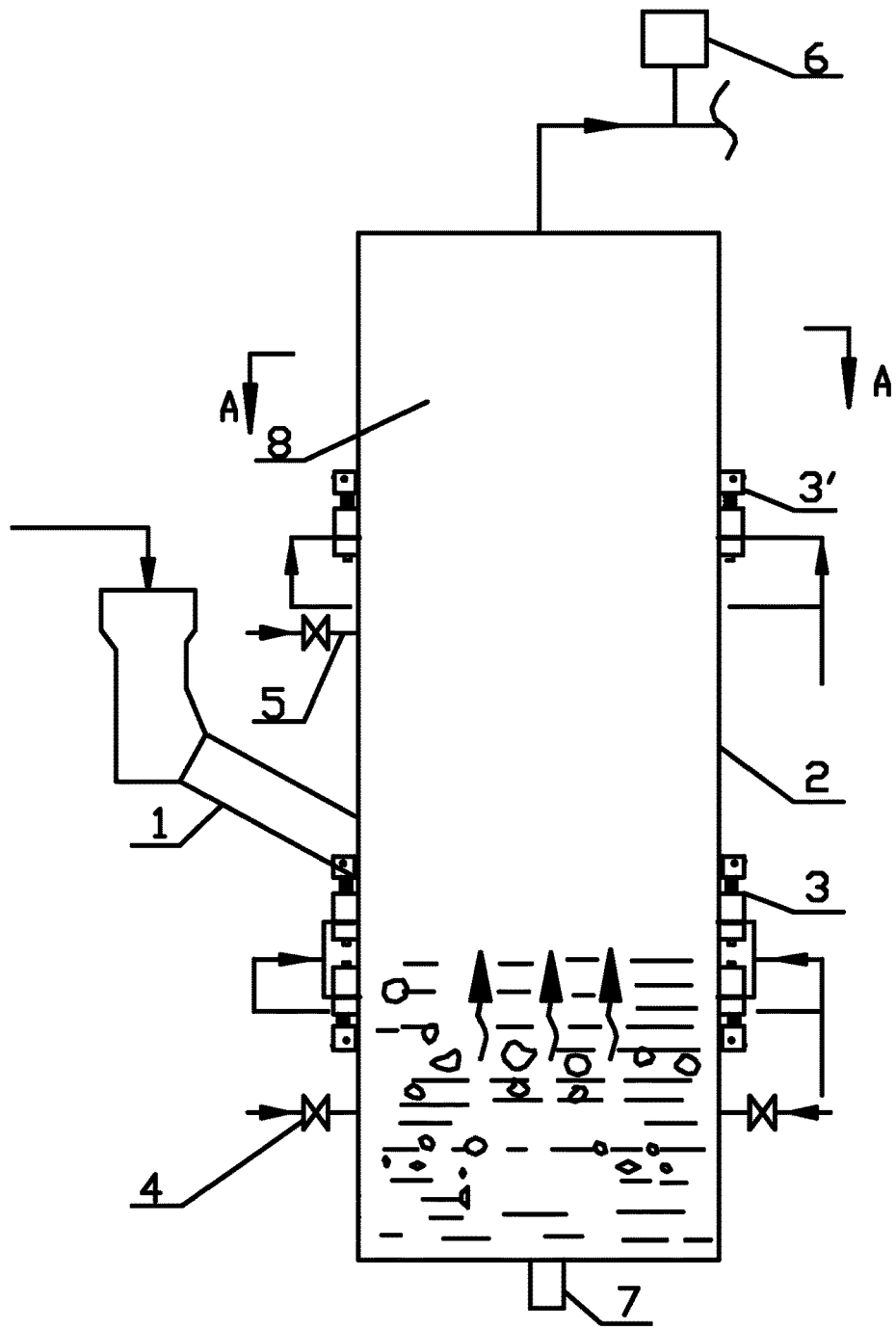
FIG. 1 shows a schematic diagram of a fixed bed gasifier of biomass and a flow chart of a gasification method using the same according to one embodiment of the invention.

In the drawings, the following reference numbers are used: 1. Feeder; 2. Furnace body; 3. Microwave plasma generator; 4. Lower oxygen/vapor nozzle; 5. Upper oxygen/vapor nozzle; 6. Monitoring unit; 7. Slag outlet; 8. Clearance zone of gasifier.

DETAILED DESCRIPTION OF THE EMBODIMENTS

For further illustrating the invention, experiments detailing a gasifier and a method for gasifying biomass and solid wastes to synthesize high quality syngas are described below. It should be noted that the following examples are intended to describe and not to limit the invention.

A furnace body 2 is a vertically disposed cylinder, a clearance zone 8 is disposed at the uppermost of the furnace body, and a fixed bed zone receiving microwave plasma is disposed at the lowermost of the furnace body. A vertical downward slag outlet 7 is disposed at a bottom of the furnace body. An upper oxygen/vapor nozzle 5 is disposed in the clearance zone 8 of the furnace body, and a lower oxygen/vapor nozzle 4 is disposed in the fixed bed zone of the furnace body. Both the nozzles can be controlled by switches to regulate the flow rate. The furnace body 2 is cylindrical, or a combination of a cone and a cylinder.

A feeder 1 is disposed in the middle of the furnace body 2 and communicates with the furnace body 2 via an inclined feeding chute. The feeding mode can optionally be screw feeding, without the need of the inclined feeding chute.

Figure 2:
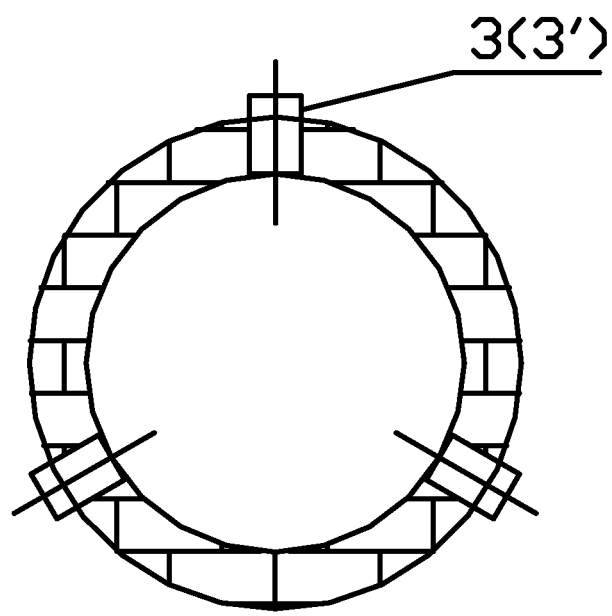
FIG. 2 is a sectional view taken from Line A-A of FIG. 1.

The number of the microwave plasma generator is determined by the content of moisture and volatile components in the biomass fuel. As the biomass fuel contains high content of moisture (about 20%) and low caloric value, in this example, the first microwave plasma generating device comprises two or three layers of microwave plasma generators 3 (in FIG. 1, there are two layers of microwave plasma generators), which are centrally disposed below the feeder 1 and slightly higher than the bed material position in the fixed bed, and each layer of the microwave plasma generators comprises three or four evenly distributed working gas inlets. The similar arrangement of the microwave plasma generators such as being disposed above the feeder is also acceptable. The second microwave plasma generating device is disposed in the clearance zone which is above the feeder 1, and comprises one or two layers of microwave plasma generators, each layer of the microwave plasma generators comprises three or four evenly distributed working gas inlets (in FIG. 2, there are three working gas inlets).

The first microwave plasma generator 3 has large power and small electrode gap, and produces high temperature of plasma; the second microwave plasma generator 3' has large electrode gap, strong plasma activity, and wide volume range, which is configured to crack the tars in the syngas, and to convert hydrocarbons such as methane in the syngas. Finally, the tar content in the syngas is reduced to meet the direct usage level in industry, and the hydrocarbon content is also reduced, which is conducive to the subsequent carbon removal.

The microwave power source of the microwave plasma generators has a basic frequency of 2.45 GHz, and a power of a single microwave plasma generator is within 200 kW.

The total power of the second microwave plasma generator meets the requirement for supplying thermal energy for the reaction equilibrium.

A monitoring unit 6 is disposed close to the syngas outlet at the top of the furnace body 2 to monitor in real time the temperature and components of the syngas to maintain process parameters within a preset range.

The biomass fuel and waste are fed into the furnace body 2 via the feeder 1 and gasified quickly in the fixed bed zone of the gasifier. Firstly, the fuel particles are pyrolyzed under high temperature to yield a large amount of volatile components and semi-coke residues. The volatile components react with oxygen and vapor in the presence of high activity of plasma generated by the microwave plasma generator. To regulate the temperature of the fixed bed zone can ensure the smooth operation of the gasification process. If the furnace temperature is too low, the working gas such as oxygen should be complemented in large, and meanwhile the microwave power of the microwave plasma generator 3 and the flow rate of the working gas are adjusted accordingly, vice versa. The vapor sprayed from the lower oxygen/vapor nozzle 4 operates to increase the vapor concentration, thereby prompting the reaction between the carbon residues and the vapor, improving the yield of $H_2$, inhibiting the formation of the tars in the reaction zone, and enhancing the quality of the syngas.

With the feeding and gasification of the biomass fuel, the syngas flows upwards to the clearance zone and is cracked. The coke residues fall downwards to the fixed bed zone and release heat energy to maintain the temperature therein. The resulting slag is discharged from the slag outlet 7. In the clearance zone 8, the syngas is further cracked in the presence of high degree of ionization and high activity of plasma generated by the second microwave plasma generator. Appropriate high temperature vapour is sprayed from the upper oxygen/vapor nozzle 5 for further cracking the tars in the syngas. Thus, the tar content is greatly reduced, which is conducive to the subsequent application.

The gasification temperature is between 700 and 1600° C.; and the temperature of the syngas is within 1200° C. The gasification temperature is between 750 and 950° C.

To achieve the optimal working conditions and satisfy the overall performance requirement of the gasification, the key is to control the temperature of the entrained flow bed, and to regulate the oxygen flow rate, vapor flow rate, and microwave power. The monitoring unit disposed close to the syngas outlet can monitor the above parameters in real time, thereby controlling the gasification process by chain and by full automation and maintaining the operation stability of the gasifier.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A gasifier comprising:
   a) a vertically disposed furnace body, the furnace body comprising a housing having a material and fuel inlet, a syngas outlet, a first oxygen/vapor nozzle, and a slag outlet; and a chamber having a clearance zone and a fixed bed zone;
   b) a monitoring unit; and
   c) a first microwave plasma generating device and a second microwave plasma generating device;
   wherein:
   the slag outlet is disposed at a bottom of the furnace body;
   the monitoring unit is disposed close to the syngas outlet;
   the chamber is defined by the housing;
   the material and fuel inlet is disposed between the clearance zone and the fixed bed zone, and is configured for introducing biomass to the chamber;
   the fixed bed zone contains the biomass and is configured for gasifying the biomass to yield a syngas;
   the clearance zone is disposed above the material and fuel inlet and the fixed bed zone, and is devoid of the biomass;
   the clearance zone is configured for receiving the syngas;
   the first microwave plasma generating device is disposed around the fixed bed zone, and is adapted to supply a first microwave plasma to the fixed bed zone; and
   the second microwave plasma generating device is disposed around the clearance zone, and is adapted to supply a second microwave plasma to the clearance zone.

2. The gasifier of claim 1, wherein:
   the first microwave plasma generating device comprises two or three layers of microwave plasma generators, and the second microwave plasma generating device comprises one or two layers of microwave plasma generators; and
   each layer of the microwave plasma generators comprises three or four evenly distributed working gas inlets.

3. The gasifier of claim 2, wherein the first microwave plasma generating device has a first electrode gap; the second microwave plasma generating device has a second electrode gap; and the first electrode gap is smaller than the second electrode gap.

4. The gasifier of claim 3, wherein a microwave power source of the first or the second microwave plasma generating device has a basic frequency of 2.45 GHz, and a power of a single microwave plasma generator is within 200 kW.

5. The gasifier of claim 4, wherein the furnace body further comprises a second oxygen/vapor nozzle; and the first oxygen/vapor nozzle is disposed in the clearance zone, and the second oxygen/vapor nozzle is disposed in the fixed bed zone.

6. The gasifier of claim 1, wherein the furnace body further comprises a second oxygen/vapor nozzle; and the first oxygen/vapor nozzle is disposed in the clearance zone, and the second oxygen/vapor nozzle is disposed in the fixed bed zone.

* * * * *